US005761684A

United States Patent [19]
Gibson

[11] Patent Number: 5,761,684
[45] Date of Patent: Jun. 2, 1998

[54] METHOD AND REUSABLE OBJECT FOR SCHEDULING SCRIPT EXECUTION IN A COMPOUND DOCUMENT

[75] Inventor: Kevin Patrick Gibson, Rochester, Minn.

[73] Assignee: International Business Machines Corporation, Armonk, N.Y.

[21] Appl. No.: 452,791

[22] Filed: May 30, 1995

[51] Int. Cl.$^6$ .................................................. G06F 9/40
[52] U.S. Cl. .................................. 707/515; 395/683
[58] Field of Search ............................ 395/700, 650, 395/600, 670, 672–675, 680, 683; 707/515

[56] References Cited

U.S. PATENT DOCUMENTS

| | | | |
|---|---|---|---|
| 4,937,743 | 6/1990 | Rassman et al. | 364/401 |
| 5,063,523 | 11/1991 | Vrenjak | 364/514 |
| 5,148,154 | 9/1992 | MacKay et al. | 340/712 |
| 5,339,392 | 8/1994 | Risberg et al. | 395/161 |
| 5,537,526 | 7/1996 | Anderson et al. | 707/515 |

OTHER PUBLICATIONS

Smith, Paul, "The OpenDoc Experience", EXE: The Software Developers Magazine, pp(6), Jul. 1994.
Smith, Paul, "SOM and OpenDoc", EXE: The Software Developers Magazine, pp(14), Feb. 1995.
Tycast, Robert L., "Component Software for the Masses: OpenDoc is Here", OS/2 Magazine, pp(3), Jul. 1994.
Adler, Richard M., "Emerging Standards for Component Software", IEEE Computer, pp(15), Mar. 1995.
Reeves et al., "A Distributed Object Road Map for Developers", OS/2 Magazine, pp(8), Sep. 1994.
"The Impact of Object–Orientation on Application Development" Cozkkuen A.A.R. IBM System Journal Sep. 1993 V32 N3 P420 (25).
R. Orfali et al., "Client/Server with Distributed Objects," BYTE, Apr. 1995, pp. 151–162.
"OpenDoc Shaping Tomorrow's Software," OpenDoc, 1993 Apple Computer, Inc., pp. 1–15.
R. Orfali et al., "Intergalactic Client/Server Computing," BYTE, Apr. 1995, pp. 108–122.
J. Mackenzie, "Document Repositories," BYTE, Apr. 1995, pp. 131–138.
E. X. Dejesus, "Dimensions of Data," BYTE, Apr. 1995, pp. 139–148.

*Primary Examiner*—Alvin E. Oberley
*Assistant Examiner*—St. John Courtenay, III
*Attorney, Agent, or Firm*—Terrance A. Meador

[57] ABSTRACT

A reusable script execution scheduling part for compound documents in a document-centric processing environment. Document-centric computing environments having architectures similar to OpenDoc™ include a technique for executing scripts to interact with the compound document content. The CHRON part of this invention includes embedded objects for defining scheduled execution times for one or more scripts that may be opened within the compound document to provide a view of its contents. Either the ScheduleTime element or the ScriptEvent element of the CHRON part may be opened and edited in place. The reusable CHRON part sets up event scheduling with the operating system so that specified scripts are run according to specified ScheduleTimes.

18 Claims, 9 Drawing Sheets

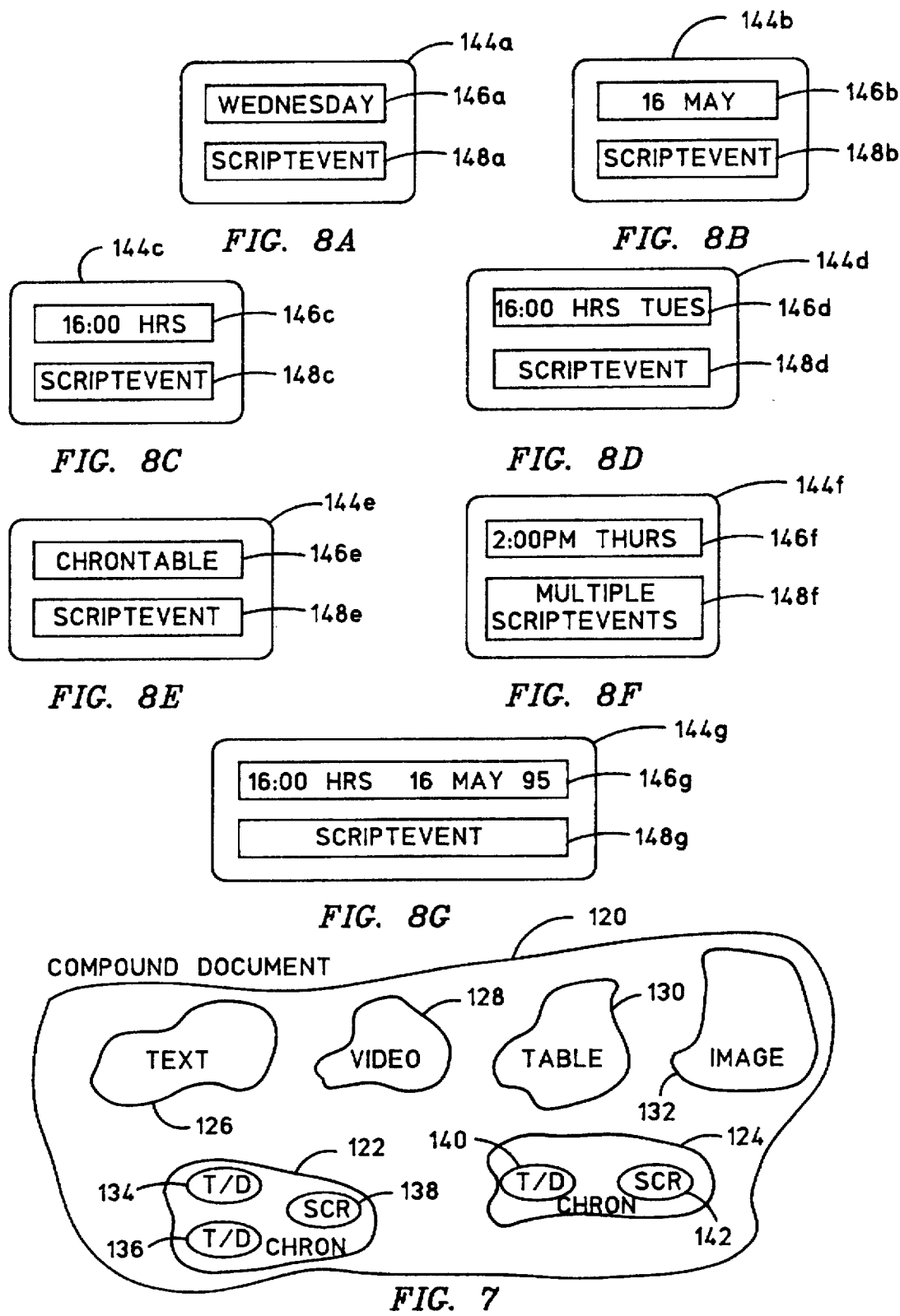

METHOD AND REUSABLE OBJECT FOR SCHEDULING SCRIPT EXECUTION IN A COMPOUND DOCUMENT

BACKGROUND OF THE INVENTION

1. Field of the Invention

This invention relates generally to event scheduling in object-oriented application systems and specifically to a reusable compound document script scheduling part that provides class methods for the scheduled execution of embedded scripts in an object-oriented compound document processing system.

2. Description of the Related Art

Object-oriented software analysis and design is fundamentally different from traditional structured software design approaches. Object-oriented technology is built upon an "object model" encompassing the well-known principles of abstraction, encapsulation, modularity, hierarchy, typing, concurrency, and persistence. Although none of the principles is by itself new, all of these elements are brought together synergistically to make up the "object" model object-oriented technology. For a fundamental treatment of object-oriented analysis and design, reference is made to Grady Booch, *Object-Oriented Analysis and Design with Applications*, 2nd ed., The Benjamin/Cummings Publishing Company, Redwood City, Calif., 1994. Reference is also made to Enian Graham, *Object-Oriented Methods*, 2nd ed., Addison-Wesley Publishing Company, Wokingham, UK, 1994 and to M. Tamar Oszu et al., *Distributed Object Management*, Morgan Kaufmann Publishers Inc., San Mateo, Calif., 1994, for additional useful discussion of the related art.

According to Booch, "abstraction" denotes the essential characteristics of an object that distinguishes it from all other kinds of objects, thus providing crisply-defined conceptual boundaries relative to a viewer perspective. The abstraction property delivers "reusability" by means of encapsulation or information-hiding. Encapsulation is the process of compartmentalizing the elements of an abstraction that constitute its structure and behavior. Encapsulation serves to separate the contractual interface of an abstraction and its implementation by declaring publicly the specification of their behavior through a set of attributes and operations while keeping private to the object all implementing data structures and methods. "Modularity" is the property of a system that has been decomposed into a set of cohesive and loosely-coupled modules. "Hierarchy" is a ranking or ordering of abstractions. "Inheritance" is the ability to deal with generalization and specialization or classification.

Object types or classes are similar to data types and entity types with encapsulated methods. Data and methods are encapsulated and hidden by objects. Classes may have concrete "instances" and the term "object" is commonly used to designate either a class or an instance. Subclasses inherit attributes and methods from their superclasses and may add others of their own or override those inherited. In many object-oriented programming languages, "instances" inherit all and only the properties of their respective "classes." Multiple inheritance occurs when an object is an instance of more than one class. The property of inheritance delivers "extensibility" but may also compromise "reusability."

"Typing" is the enforcement of the class of an object, such that objects of different types may not be interchanged or may be interchanged only in very restricted ways. "Concurrency" is the property that distinguishes an "active object" from one that is not active. "Persistence" is the property of an object through which its existence transcends time and/or space. Normally, a software object occupies some amount of space and exists for a particular amount of time. Objects exist over a continuum, ranging from transitory objects that arise within the evaluation of an expression to persistent objects in a database that outlive the execution of a single program.

Object-orientation in a software system or computer system is characterized by the two key features of "encapsulation" and "inheritance." There is a tension and opposition between these two abstractions. The key benefits associated with object-orientation are "reusability" and "extensibility," which may be loosely associated with the two key object features. Inheritance violates reuse because subobjects may have privileged access to the implementation of their superobjects' methods, while encapsulation may discourage extensibility in systems with complex objects containing more than a few basic methods. Finally, objects communicate only by message-passing. The use of "polymorphism" or "overloading," whereby the same message symbol is used for different purposes depending on context, increases readability and programmer productivity but may lead to slower software implementations. Accordingly, practitioners in the art strive to balance the mutually, inconsistent properties of reusability, extensibility, and polymorphism in object-oriented software systems to optimize overall system performance.

Improvements in the object-oriented software system arts have given rise to many commercial specifications for object-oriented environments. The Object Management Group (OMG) is an industry consortium dedicated to producing such specifications and includes hundreds of member organizations. The OMG has published a Common Object Request Broker Architecture (CORBA) specification (*The Common Object Request Broker: Architecture and Specification*, OMG Document No. 91.12.1(Rev. 1.1), OMG Framingham, Mass., 1991). CORBA specifies a bare-bones architecture for distributed object management and includes facilities for defining the objects from which applications can be constructed and the manners in which these objects may interact. The CORBA model is designed to be mapped onto a variety of vendor-specific object models that can ultimately support concrete implementations. The success of the CORBA approach to distributed object management systems depends on the ease with which objects can call on one another's services across different ORB implementations. That is, practitioners may independently create new objects and classes in accordance with the CORBA-defined object interface and expect these new objects to interoperate with other independently-developed software objects in particular system architectural environments.

With the development of the CORBA specification and the related Interface Definition Language (IDL) specification, several new object-oriented system environments have been developed by practitioners in the art, including a class of environments herein denominated "document-centric" processing system. The emergence of document-centric computing technology represents a major event in the transition to object-oriented technology from process-oriented technology. The document-centric computing art now includes at least three commercially-available compound document architectures. These include Microsoft's Object Linking and Embedding (OLE™) System, the Taligent™ consortium's compound document framework, and the Component Integration Laboratory (CI Labs) OpenDoc™ compound document application architecture. CI Labs is an independent industry consortium responsible for the OpenDoc architecture. Reference is made to the OpenDoc white paper (*OpenDoc: Shaping Tomorrows Software*, Apple Computer, Inc., Cupertino, Calif., 1993) for an introduction to the OpenDoc architecture.

Major elements of the OpenDoc architecture include objects for "documents," "parts," "part handlers," and "frames." The OpenDoc "document" is a "compound document" and is fundamentally different from the usual meaning of the term document. A compound document is no longer a single block of content bound to a single application but is instead composed of smaller blocks of content herein denominated "parts." Parts are the fundamental building blocks of the OpenDoc architecture, replacing monolithic applications with smaller units of content dynamically bound to related functionality. OpenDoc parts each contain data. For example, text parts contain characters, graphics parts contain lines and shapes, spreadsheet parts contain spreadsheet cells with formulas, and video parts contain digitized video. The particular data type within each part is defined by the part developer and is denominated the part's "intrinsic content." In addition to intrinsic content, a part may contain other parts, each having its own intrinsic content. Every compound document has a single "root part" at the top level into which all other parts are embedded. Usually if a part can contain one type of part, it may contain all conforming types of parts, including OpenDoc parts yet to be developed.

Parts may also be viewed as the boundaries at which one kind of content in a document ends and another begins. Each part of a document has its own content model, which is the model of objects and operations that is presented to the user. The content model changes at the "frame" between parts in a compound document. Frames are areas of the display that represent a part but also serve as a handle permitting manipulation of the part as a whole as well as permitting the user to see and edit the intrinsic contents of a part. A frame is much more than a standard application window, which is only visible when the part is being viewed or edited. A frame is persistent and remains visible when opened into a window. When the window is closed, the part returns to the representation from which it was opened and remains as a persistent element of the compound document.

In the OpenDoc architecture, "part handlers" are the rough equivalent of application programs. Part handlers include part editors and part viewers and may be responsible for displaying the part both on the screen and for printing purposes, editing the part, and storage management (both persistent and runtime) for the part. The part handler must read the part from persistent storage into main memory, manage the runtime storage associated with the part and write the part back out to persistent storage when appropriate. Part handlers are dynamically linked into the runtime world of the compound document depending on the part types that appear in the compound document.

Calling between objects is fundamental to the OpenDoc architecture, which uses the International Business Machine Corporation System Object Manager (SOM) as the object calling mechanism. SOM provides an object interface standard that conforms to the CORBA industry standard for distributed object messaging. Accordingly, practitioners in the art may create parts in a wide range of languages and these parts may interoperate through CORBA-compliant application programming interfaces (APIs) under SOM.

The OpenDoc architecture storage model is based on the Apple Computer, Inc. Bento™ Object Container System (OCS) that functions as the reference file storage system, the object container for parts placed on a clipboard, and the container for transporting documents across platforms. The OpenDoc architecture also provides the Open Scripting Architecture (OSA) for scripting languages such as OREXX, AppleScript, ScriptX, and OLE Automation. OSA includes script typing that permits identification of the correct scripting engine for script processing and standardization of script semantic messages according to the Open Events form required by OSA. Scripts may become a part of the compound document, either attached or embedded as necessary. They may also operate as control structures, as front- or back-ends to operations or as instructions for use embedded into a compound document for transfer across system boundaries. Parts that are OSA-scriptable must register their capabilities by declaring the event suites that they support. Scripts are then built for a particular set of event suites and those scripts then may run on all parts that support those particular suites.

According to Robert Orfali et al. ("Special Report: Intergalactic Client/Server Computing," *Byte*, pp. 108–122, April 1995), the commercial alliances arising from the OMG, including CI Labs, may eventually lead to an object infrastructure that can meet the demands of the "intergalactic" client-server era (the "third wave" of computer network technology). However, Orfali et al. observe that the present state of the art is not yet capable of providing the object services necessary for the "third wave" era and cite problems such as transactions, locking, life cycle, naming, and persistence. Moreover, not all document-centric architectures (e.g., OLE) are yet available in the CORBA-compliant form required for distributed systems.

Another problem felt in the compound document art is the lack of any useful method for scheduling a point in time for executing an OSA script in a compound document. This particular problem results in part from the power of the OSA, with which scripts may be either attached or embedded in compound documents or in other parts as desired and thereafter carried along across boundaries throughout a distributed system with the parent part or document. Scripts may be executed either in response to a user command or in response to a message from another object, but execution of a script at a predetermined date and time is more problematic. The event scheduling element of the operating system must first create and store a persistent log entry specifying the date and time for execution of the script in the system event log. If a special-purpose application program is used to create the necessary log entry, the resulting application object does not provide for "reuse," thereby increasing programmer workload and system complexity. If the necessary date and time commands are included in the script itself, then the script cannot be "reused" and must be revised for each desired execution data and time. That is, the usual process-centric solutions to script-execution scheduling are not effective in the document-centric system model, and no user alternative techniques have been suggested by practitioners in the art until now.

For instance, the concepts of an "alert demon" or "trigger" are well known in the process-centric software arts. In U.S. Pat. No. 5,339,392, Risberg et al. disclose a software program permitting the user to compose a custom "active document" using a suite of tools provided by the program. The user may define alarm limits against which real-time data updates are compared as well as script of commands to be performed in case an alarm limit is exceeded. The same scripts may also be triggered by the user from a menu. Risberg et al. disclose a system that permits the user to create a customized "document" wherein each document component is actively updated in accordance with real-time data arriving from a remote server. They neither consider nor suggest application of their tools to a document-centric processing environment and neither consider nor suggest a reusable object for scheduling script execution at predetermined times.

As another example, in U.S. Pat. No. 5,148,154, MacKay et al. disclose a multi-dimensional user interface for use with unified multimedia production systems. MacKay et al. limit their disclosure to a Graphical User Interface (GUI) for multimedia editing that depicts a three-dimensional event horizon from a selectable viewpoint. Selected events may be "dragged" down to an event horizon bar by the user, who may select the schedule location by visual comparison with other events, thereby automatically revising the scheduled date and time associated with the "dragged" element. MacKay et al. limit their discussion to a process-centric system architecture for building "active documents" and neither consider nor suggest reusable objects for document-centric architectures.

In U.S. Pat. No. 4,937,743, Rassman et al. disclose a project resource scheduling GUI system that provides automatic conflict resolution, periodic monitoring and alarm-triggering of scripts. Again, although Rassman et al. consider the dynamic management of a plurality of resources, they neither consider nor suggest reusable objects for object-oriented processing in a document-centric system architecture. In U.S. Pat. No. 5,063,523, Vrenjack discloses a data communication network management system that permits a user to establish rules for pattern-matching to selected attributes of incoming events, such as alarms, from network objects. Although Vrenjack describes a process-centric system including the well-known concept of an event that can trigger a script, where the event may also be date or time based, he neither considers nor suggests any method for providing a reusable compound document script scheduling part suitable for document-centric applications.

Accordingly, there is still an unmet need for a class type or method to run scripts at predetermined times in a document-centric computing environment such as the Open-Doc architecture. Such a method must operate within the context and limitations of the compound document without unnecessarily avoiding the advantageous features of the document-centric computing environment. The related unresolved problems and deficiencies are clearly felt in the art and are solved by this invention in the manner described below.

SUMMARY OF THE INVENTION

This invention solved the script execution scheduling problem by introducing a new class type, herein denominated the CHRON type, for scheduling script execution in a compound document. Because each "instance" of the CHRON class is an object, it provides the reusability and extensibility features necessary for proper integration into a document-centric architecture such as the OpenDoc architecture. The CHRON part defines the point in time at which a script is to be executed and includes one or more embedded script parts that specify the scripts to be executed, one or more embedded times/date parts that specify when the scripts are to be executed and may also contain embedded tabular specifications of relationships between time parts and script parts. The CHRON part is represented to the user when minimized by an icon that displays the predetermined script execution time.

It is an object of this invention to provide a reusable compound document script scheduling part for automatic script execution at predetermined times. It is a feature of the CHRON part of this invention that it is both reusable and extensible in accordance with object-oriented programming architectural requirements. It is an advantage of the CHRON part of this invention that it may be manipulated by the user through a Graphical User Interface (GUI) to quickly and easily revise either the designated scripts or the time/date parts that specify when the scripts are executed.

It is another object of this invention to provide a simple, intuitive user interface for launching and revising script execution time schedules. It is an advantage and feature of the CHRON part of this invention that the CHRON icon may be configured to indicate repeated execution times (e.g., daily, weekly, or monthly), single execution times (time/date/year), and/or custom tabular specifications of script execution times.

The foregoing, together with other objects, features, and advantages of this invention, can be better appreciated with reference to the following specification, claims, and the accompanying drawing.

BRIEF DESCRIPTION OF THE DRAWINGS

For a more complete understanding of this invention, reference is now made to the following detailed description of the embodiments as illustrated in the accompanying drawing, wherein:

FIG. 7 is a functional block diagram of an illustrative embodiment of a compound document including the CHRON part of this invention;

FIGS. 8A–8G provide several illustrative embodiments of the CHRON part icon in accordance with this invention;

DESCRIPTION OF THE PREFERRED EMBODIMENTS

The class type and object of this invention may be better understood in view of a brief discussion of the object-oriented programming art in general and compound document architecture in particular. With the advent of object-oriented programming techniques leading to compound document architectures such as OpenDoc and OLE and the document framework in Taligent, the computing model for the user has evolved from a "tool-centric" to a "document-centric" model. In the document-centric model of computing, the user may focus on the document desired rather than on the output of some specific tool or application program. To the user, a document is now composed of several "parts" that are each embedded and integrated into a "document." The parts are "class types" or objects that may now be completely incorporated into the document. Part usefulness depends only on availability of the necessary part handler application (e.g., part editors and part viewers).

Compound Document Architecture In General

The generic document-centric system providing for the embedding of objects into a document is embodied in an object-oriented system such as the OpenDoc or Taligent document framework. The fundamental concept of the compound document is that it can hold different kinds of data in the form of individual document parts and that each kind of part is handled by an independent application or part handler. Each part handler independently understands its own intrinsic content and need not know anything about the intrinsic content of other parts embedded therein. The integration and cooperation of these parts is accomplished by the compound document system architecture, policies and protocols.

Figure 1:
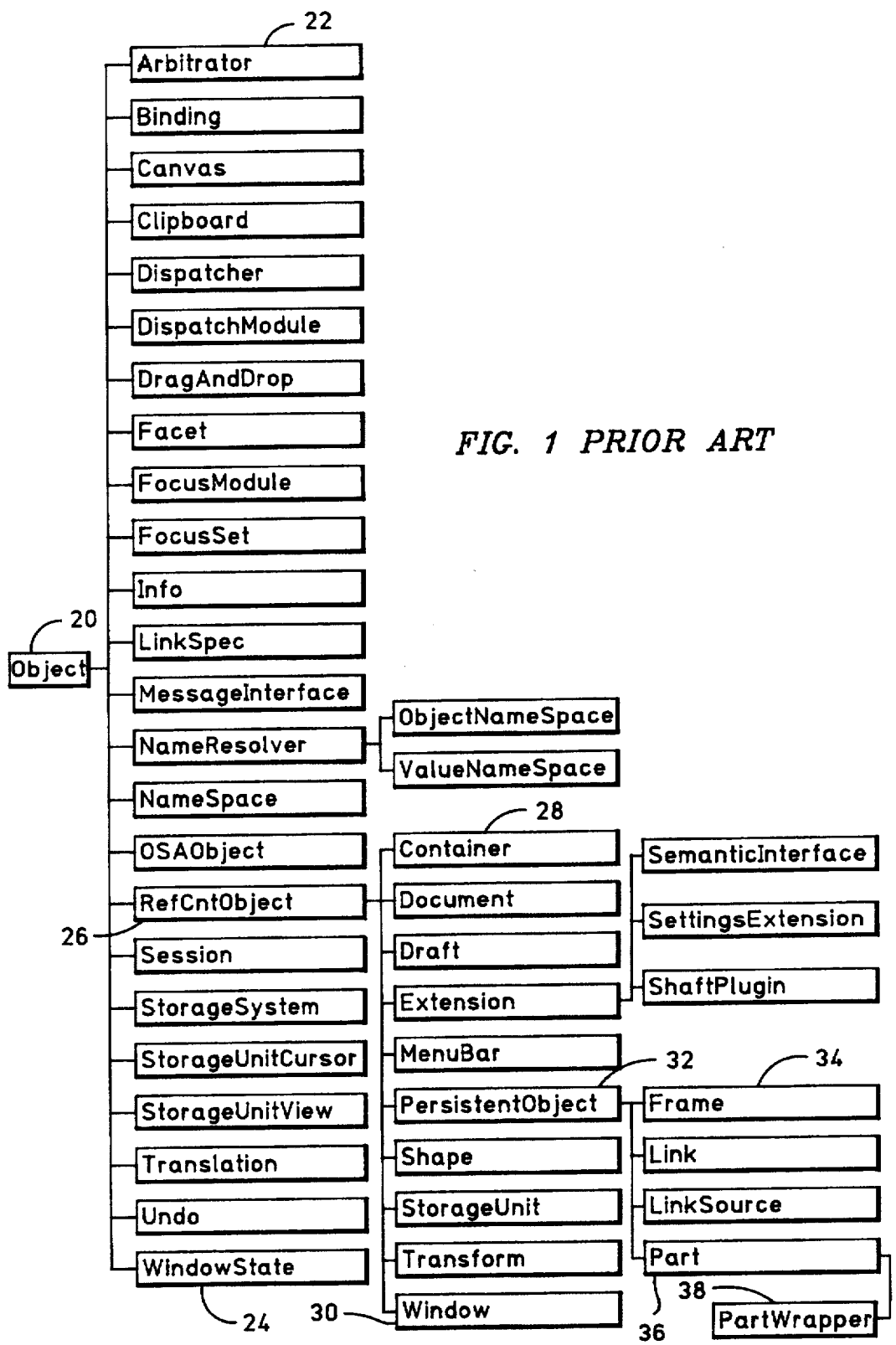
FIG. 1 shows the principle classes of the OpenDoc™ Class Hierarchy from the prior art.
Figure 2:
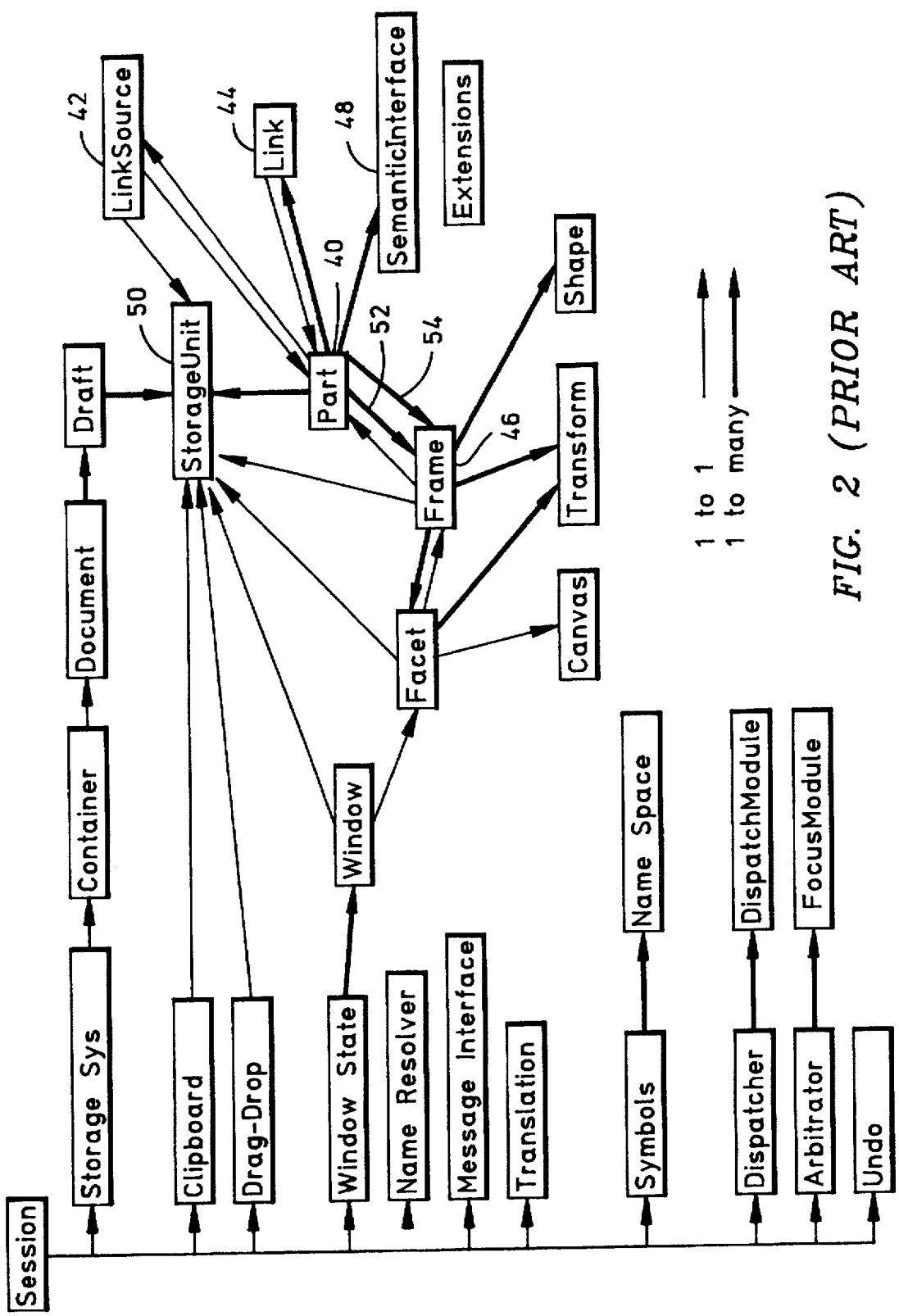
FIG. 2 shows the OpenDoc™ RunTime Object Relationships from the prior art.

FIG. 1 shows the class library of objects (SOM or CORBA objects) employed by the OpenDoc system to realize the basic interfaces necessary in a compound document architecture. FIG. 1 also shows the inheritance relationships of the OpenDoc class library known in the art. FIG. 2 shows the runtime relationships of the primary OpenDoc object type, which is more meaningful to the system developer. FIGS. 1 and 2 exemplify one embodiment (the OpenDoc system) of the general compound document architecture, which is now discussed.

A compound document consists of parts embedded in a document container. The content of any particular part is not limited because each part is isolated from the other by the document architecture. The only practical limitation on content is the availability of a part handler, either editor or viewer. As new part handlers are created, they may be immediately used to manage the appropriate parts. The user may rely on a clipboard and on drag-and-drop mechanisms within the document. Part handlers may be changed or replaced to fit specific user requirements, which may be satisfied independently of existing documents because these do not depend on any specific part handler. The different parts are isolated by using linkages for data transfer and navigation, which may be both internal to the compound document (such as hypertext-type links) and external to the compound document (for data transfer and navigation).

The fundamental problems faced in a compound document system include data exchange, part registration, part-to-part communication, document layout, user interface control, events and messages, document versioning and document storage. Many compound documents are built-up by the movement of data from one document (or the desktop) to another either through a cut-and-paste or a drag-and-drop operation by the user. These interfaces determine how data is moved from one document to another and must therefore define how data is added and removed from the clipboard. The interfaces must also transfer type and attribute information so that the proper part handler application program can be retrieved from the part handler database and launched. Because the clipboard must transfer complex data-objects, an in-memory object container is also required. The storage format standard for clipboard data in OpenDoc is the Bento container shown in FIG. 3.

When a container receives data on the clipboard for a particular part type, an interface is needed to assist in locating and launching the correct part handler for that part type. Also, when a part handler is installed into the system, it needs an interface with which to register itself and the supported part types. A part handler may register itself claiming to handle several part types (e.g., different image formats) or several part handlers may each register claiming to handle the same part type. The user, for convenience, may establish a preferences file to define the specific part handler desired for each particular part type. As an example, if a user has two word processors available, each with its own proprietary binary format and each also supporting the import of other formats including the binary format of the other, the user may set up a part handler preference so that each word processor is used to edit only its own binary file type. This preference could be overridden when the user wishes to convert between formats.

Part-to-part communication requires an interface between parts and between the containing part and its embedded subparts. This interface must provide access to internal part data, pass to the parts commands such as "save your data," "externalize yourself," and the like, and must pass requests to accept or release control of some global resource such as the menu bar or input focus.

With a number of embedded parts sharing space on the screen and in a printed document, central coordination is required over display layout. The display layout controls operate with document window geometry and the geometry of embedded parts, which contains information about the size, shape, position, clip extents and transformations of the frames and windows together with the means for establishing and manipulating them. A document layout interface must handle the negotiation for space resources between the part handler and the container. It is used when the part must grow or shrink in size in response to user interactions such as picture editing or data changes arising from a link update of embedded data. The part container establishes the policy for document layout and has final authority therefor. Such negotiations may result in the part being placed on a new page, or being split into more than one piece or in the rearrangement of the document to accommodate a new part size or even in refusal of authority for the part to change size.

The user interfaces must include interfaces for negotiating access to the user interfaces and other global resources. When a user selects a part with the mouse, the part handler must spawn its user interface and menus to replace those previously displayed. Also, an overall container policy must determine which menus are global to the entire document and which merely local to the selected part.

Several interfaces are needed to distribute, send, receive and interpret both events and messages. Such interfaces govern low-level events such as mouse moves or button pushes, middle-level events such as window manager events, and high-level events or semantic messages. These interfaces also support scripting because scripts can be treated as collections of semantic messages.

Document collaboration and versioning interfaces manage multiple drafts or versions of a compound document and must provide for the election and creation of a compound document draft together with management and reconciliation of multiple drafts. These are closely related to document storage interfaces, which manage the storage and retrieval of a compound document and its parts. Document storage interfaces must be abstracted from the underlying storage systems sufficiently to support a multiplicity of different storage systems. In the OpenDoc reference implementation, the storage system is constructed using Bento containers, for instance.

OpenDoc™ Compound Document Part Interfaces

FIG. 1 shows the inheritance relationship of the OpenDoc class library. For instance, the class type "Object" 20 is a basis of twenty-four offspring class types, from class type "Arbitrator" 22 to class type "WindowState" 24. Each of the offspring class types inherits all methods and attributes of class type 20. Further, the class type "RefCntObject" 26 is the parent of ten progeny from class type "Container" 28 to class type "Window" 30. Within this group, the class type "PersistentObject" 32 provides the methods and attributes to the four progeny from the class type "Frame" 34 to class type "Part" 36. Finally, the class type "PartWrapper" 38 inherits properties from class type "Part" 36.

The independent part developer starts with "Part" 36 to create a new OpenDoc part. Class type "Part" 36 has sixty-two methods as part of its interface and, for simple new parts and quick prototypes, only a dozen or so of these interfaces need be changed to create a new part. A new part handler must draw its part, receive its part's data, activate its part and handle events sent to its part. It also needs some sort of command or user interface and must provide menus for the menu bar, optional windows, dialogues and palettes, and must provide for containing other parts as necessary. The part editor must embed frames, create facets for visible frames and store frames for embedded parts if any. Beyond these capabilities, the new part handler may support asynchronous drawing, drag-drop and cut-paste operations, scripting and linkages to other parts. An existing application may be simply converted to an OpenDoc part handler by starting with one of the class types in FIG. 1 and "subclassing it." This ensures correct default behavior for content-independent actions and allows for rapidly adding application functionality.

FIG. 2 shows the message transfers between various class types at runtime in the OpenDoc architecture. For instance, the Part object 40 accepts messages from no more than one LinkSource object 42, no more than one Link object 44 and no more than one Frame object 46. Part object 40, together with any other embedded Part objects (not shown), transmits messages to the SemanticInterface object 48, the StorageUnit object 50 and Frame object 46. The messages to Frame object 46 include messages 52 for its own Frame and messages 54 for the frames of all embedded parts within part 40.

Figure 3:
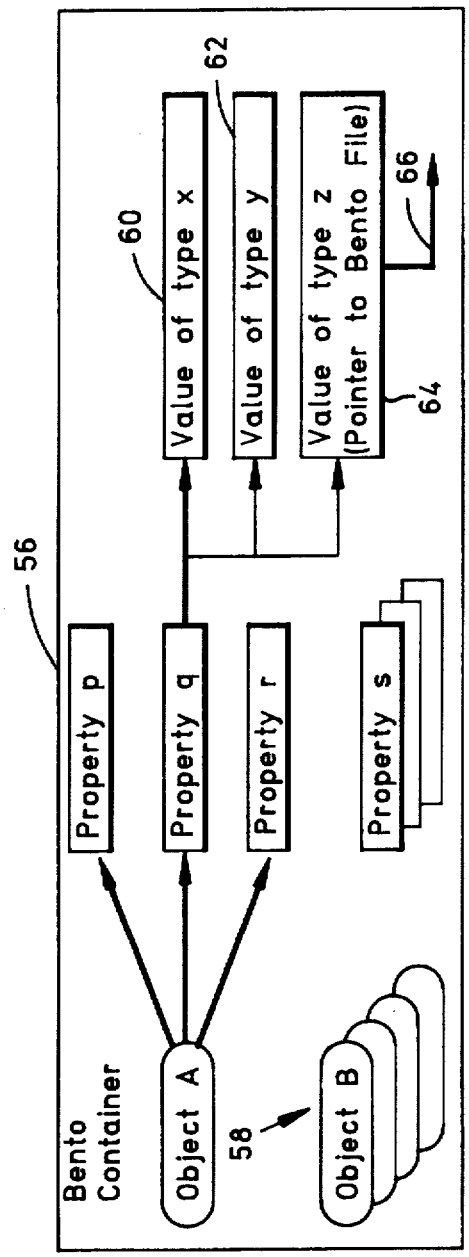
FIG. 3 is a functional block diagram illustrating the Bento™ Data model from the prior art.

FIG. 3 shows the Bento object container 56 known in the art. Bento container 56 can be thought of as an "envelope" for objects and it may be generally applied to any object-oriented programming system, including the OpenDoc document-centric programming system. Bento container 56 includes standard procedures for moving itself, for viewing the inventory list, for removing things from and adding new things into the envelope. All such procedures are independent of container contents. In a document-centric architecture, Bento container 56 serves three functions. It is the reference file storage system, the object container for things placed on the clipboard and the container of choice for transporting compound documents across platforms.

The Bento methods may be considered as a file system within a file but it is actually a flat structure and not a tree structure reflecting the embedding relationship. In FIG. 3, Bento container 56 includes a plurality 58 of objects, exemplified by Objects A and B. Each Object has one or more properties associated with that object and each such property has a set of values or data. For instance, Object A includes Properties p, q, and r. Property q may be formatted text stored in several different formats; e.g., RTF format 60, SGML format 62, and ASCII format 64, which could include a pointer 66 to another Bento container (not shown). In the OpenDoc system, StorageUnit object 50 (FIG. 2) is similar to Bento Container 56 (FIG. 3) but is also adapted to function as the front end for other storage types such as in an object-oriented database management system or in another object storage system such as the OLE DocFile Format.

Figure 4:
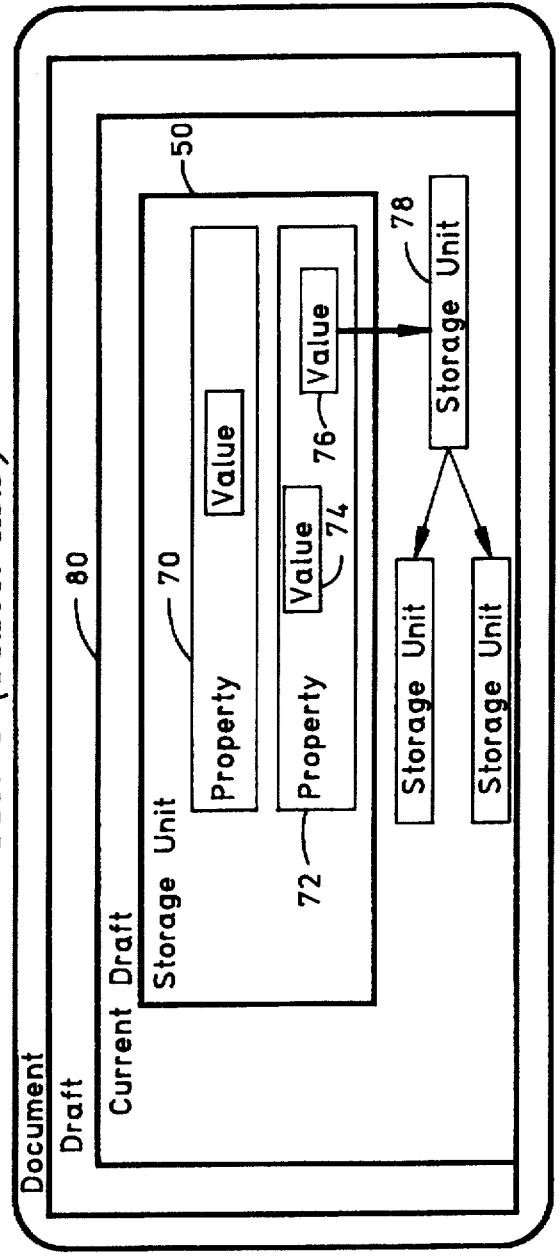
FIG. 4 is a functional block diagram illustrating the OpenDoc™ StorageUnit Structure based on the Bento™ model of FIG. 3 from the prior art.

FIG. 4 shows the structure of the OpenDoc StorageUnit class type embodied as object 50. Object 50 includes two "Property" objects 70 and 72. Property object 72 includes two embedded Value objects 74 and 76. Value object 76 is linked to another StorageUnit object 78, which is itself embedded in the same current draft object 80 containing StorageUnit 50. StorageUnit object 78 is also linked to two other commonly-embedded StorageUnits 82 and 84.

Figure 5:
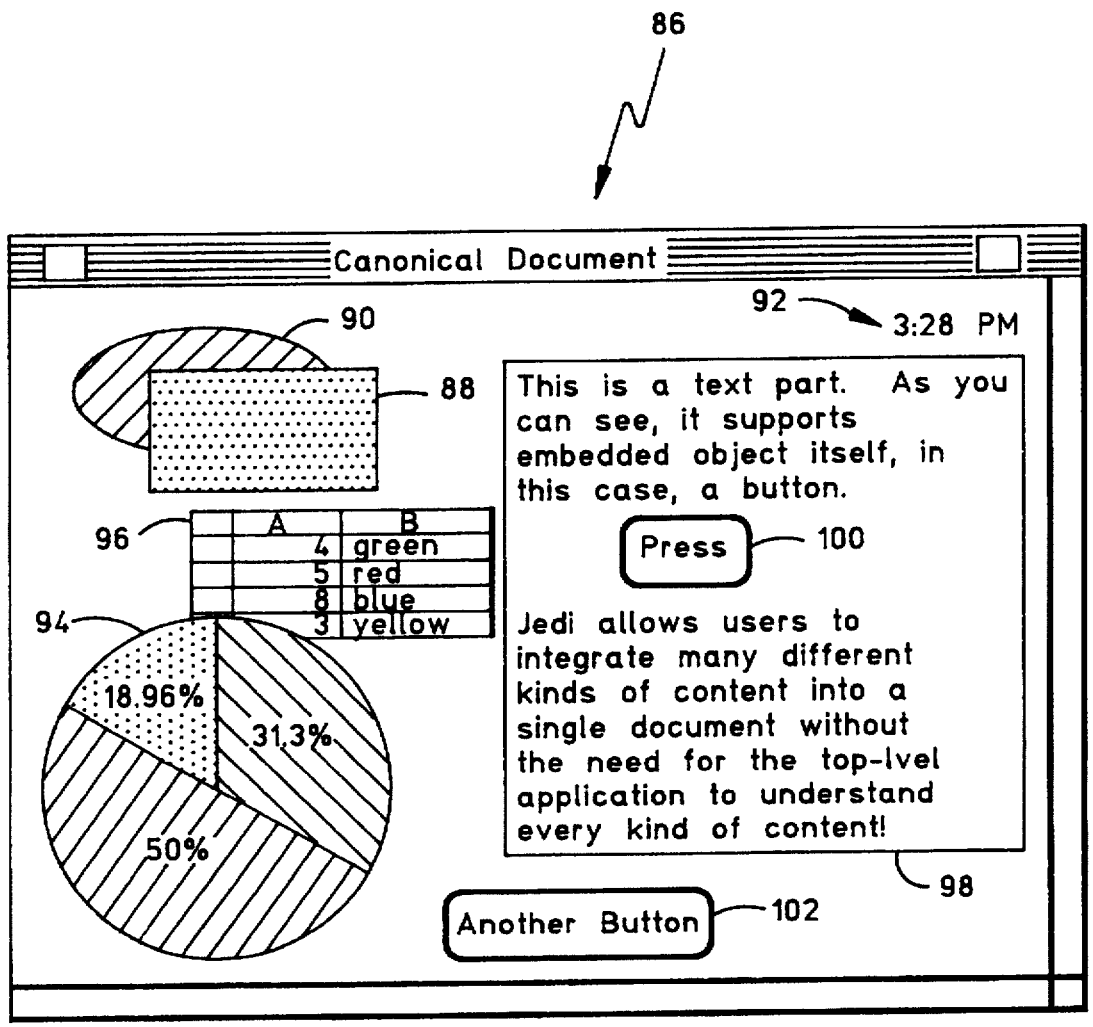
FIG. 5 shows an example of a compound document in accordance with the OpenDoc™ Architecture from the prior art.

FIG. 5 shows a "canonical" compound document display 86 according to the OpenDoc model, which enables the creation of compound documents that are created and edited by several cooperating applications working within a single compound document.

Document 86 is shown as a collection of parts each of which is much like a single "document" under the previous "tool-centric" model. In document 86, all parts are embedded in the "root" part which is managed by an object-style graphic editor. There are two content objects in the upper left corner, a rectangle part 88 and an elliptical part 90. A clock part 92 is embedded in the top right corner. Toward the center and bottom left, a chart part 94 overlaps a table part 96. In the right center, a text part 98 is embedded. A button part 100 is embedded within text part 98. A second button part 102 is embedded in the root graphics part at the bottom center of the document.

The key to the notion of parts is that each part of a compound document has its own "content model," which is the model of objects and operations that is presented to a user of the part. The content model changes at the boundary between parts. For instance, in document 86, text part 98 includes lines, words, paragraphs, characters, and embedded button part 100. Internally, the part handler in charge of part 98 may have a model that includes run-length encoded arrays for style information, line end arrays and similar tools. These are not presented to the user so they are not part of the content model. In the root graphics part of the compound document, the content objects may look very different. Circles, rectangles, and lines are content objects that could be provided in such a graphics part.

The content model also includes operations such as selection, deletion, insertion, setting properties, and the like. Again, there may be low-level internal routines such as routines that allow efficient insertion of text but, just as with the objects, only those items accessible to the user are considered part of the content model. Thus, parts may be each properly defined as a bounded set of content that has a single content model. Whenever the content model changes, a part boundary has been reached.

Notice that elliptical part 90 and rectangular part 88 in the upper left corner are not parts at all but are instead referred to as content objects. This leads to a key point: an embedded part is fundamentally distinct from the ordinary content elements such as simple shapes, characters, cells and the like. When a part boundary is reached, additional protocols are invoked because more than one part handler is involved in giving user access to the information at the boundary. Thus, in a working OpenDoc document, a part is both a user-visible abstraction and a useful programmatic abstraction. A given part may be edited with minimal effect on the surrounding document content and its storage is manageable independently of the storage of other parts.

A part and its handler together form the equivalent of a programmatic object (data and methods) in the object-oriented programming sense. The part provides the state information while the part-handler provides the methods or behavior. When bound together, they form an editable segment of a compound document. Part handlers are dynamically linked into the runtime world of the compound document based on the part types that appear in the document. Because any type of part may appear in any document at any time, the part handlers must be dynamically linked to provide a smooth user interface. The OpenDoc system assumes that parts are mainly used in a shell that allows a compound document to act like a single application. This document shell provides an address base, distributes events and provides basic user interface resources such as windows and menus.

Because one of the important features of the OpenDoc system is customized documents, the part handlers must handle two distinct kinds of events: semantic events and user-interface (UI) events. The difference between the two event types relates to whether the event makes sense outside of the particular document display context. A UI event requires information about where windows are located in the display, how parts of the document have been scrolled, or in what part a selection was last made. These events include mouse clicks, keystrokes and menu activations. In contrast, a semantic event relates to the semantics of the compound document and is generally independent of the graphical context. Semantic events relate to the content model of the part.

This distinction between kinds of events provides a number of architectural advantages. OpenDoc applications are easier to script and record while also being easier to adapt to a new UI environment than are traditional applications. OpenDoc documents and handlers are easily modifiable because the semantic interface permits extension or alteration of the UI without disturbing the core computational elements. Both kinds of events are passed to the part handlers by a generic document shell that performs many document-wide functions. One of the primary functions of this shell is the passing of events to part handlers. Typically, the shell is provided by a platform operating system supporting the OpenDoc architecture.

Because a part handler is bound to a part based on the part type, a "part registry" table associating handlers with parts must be maintained somewhere in the system. The operating system also maintains a number of similar tables that are associated with data translation, scripting systems and the like. In each case, the table is used by a binding mechanism to choose the proper code with which to execute a task.

Given the presence of multi-part compound documents, a persistent storage mechanism is needed to enable multiple part handlers to share a single compound document file. OpenDoc assumes that such a storage system can effectively give each part its own storage stream and that reliable references can be made from one such stream to another. Because many code sections may need access to a given part, the storage system must support a robust annotation scheme allowing information to be associated with a part without disturbing the part format.

At runtime, OpenDoc assumes that an instance of the document shell is created for each document. This generic shell must provide four basic structures to the part handlers: (a) the storage system, (b) the window and its associated state, (c) the event dispatcher and (d) an arbitration registry for negotiating shared resources such as the menu bar. The runtime shell may also be responsible for binding and loading part handlers for the parts that appear in the compound document. It is assumed that once a given part handler is loaded, any part in any document may share the executable code of the part handler.

Once several parts are competing for space on the display or the printed page, layout may become complex and difficult. To handle this, the OpenDoc system uses a "frame" concept for regulating negotiation for space between parts. Frames form the basis by which documents are composed from smaller parts and the frame structure provides information about layout, containment and document context.

OpenDoc supports the notion of content-centered scripting, which increases the level of customization available to the user for documents or applications. Content-centered scripting relates to the part content model. To be scriptable, a part handler must have a content model including a constituent list of content objects and operations. The OpenDoc model assumes a method of delivering semantic "events" from a scripting system to part handlers, which respond to the events. Extensive part handler support is needed to obtain higher levels of scripting support.

OpenDoc also supports the notion of compound user interfaces (UIs). This permits the user to build user interface elements such as dialogues, tool palettes, tool ribbons and menus. These UI elements and individual part handlers can be made to communicate through scripting or extension interfaces, which permits the altering or extension of existing graphical interfaces for the part handlers.

OpenDoc supports scripting and, by specifying a naming scheme that can span part boundaries, the user may navigate to the content object in question using familiar document structures. Any part of any document visible on the network can be scripted transparently. A given semantic "event" cannot act in more than one part at a time, however.

Because OpenDoc separates the part handlers from document level functions, new features can be added to compound documents without revising of existing applications. OpenDoc's document shell thus provides access to existing applications without modification. OpenDoc also allows for collaboration between parts through scripting. Scripting forms a rich medium for coordinating the work of parts in documents and allows users and parts to work together to perform tasks.

The Open Scripting Architecture (OSA) provides an open architecture for scripting languages such as OREXX, Apple Script, OLE Automation, and Scriptx. The OSA includes two components. The first is the typing of script types that permits inclusion of the correct scripting engine for script processing. The second is the standardization of script semantic messages in the Open Event form. Scripts become part of a compound document, either attached or embedded as necessary. They may be used to implement control structures or used as instructions for embedding into documents that are mailed or transferred out of the network.

The Open Events model is based on the standard registry of verbs and object classes. Open Events are arranged in application suites that include such application groups as "Required," "Core," "Text," "Table," "Database," "Compound Document," and many others yet to be invented. Each event includes three elements. These are (a) event verbs such as "Open," "Close," "Select," "Get," "Put," and the like, (b) object classes or object specifiers such as "Application," "Document," "Word," "Paragraph," "Circle," and the like, and (c) descriptor types such as Boolean Fixed Attribute "greater than," "3rd," "bold," and the like.

The parts that are OSA-scriptable register their capabilities by declaring the event suites that they support. Scripts then may be constructed for a particular set of suites and those scripts can run on all parts that support the particular suites. The set of event messages is open-ended and a suite's set of messages may be extended or redefined completely to form new suites. The available set of events for suites beyond "Required" and "Core" is small. In most cases, the verbs from the Core suite are used with some of the semantics redefined. It is the object specifiers for each suite that provide the real capability and richness. Each suite has a hierarchy of objects on which it can act. Single event messages of considerable complexity and richness may be composed by combining these three types of elements. An example of such a message is:

Get all words that have the first character "w" and have the bold attribute in paragraph 5 to paragraph 12 of the document called "foo."

Figure 6:
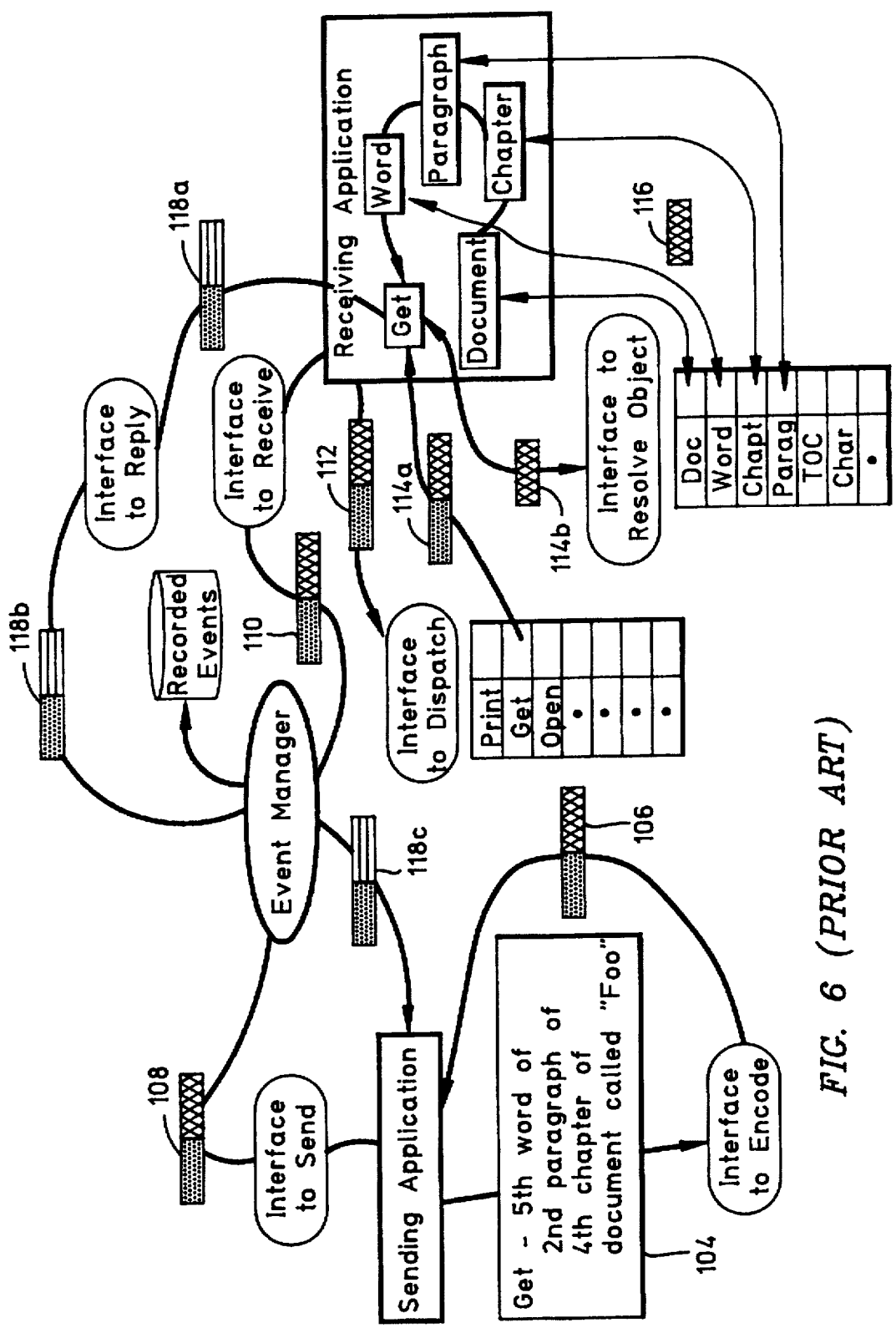
FIG. 6 is a functional block diagram illustrating the execution of an Open Events script from the prior art.

FIG. 6 shows the steps taken for execution of the above script example, which illustrates several key points. There are utility functions in the OpenDoc system to assist in building event records, delivering event records and decomposing event records for action. For each of the event messages forwarded by a part, the part has registered a function that should be invoked; essentially a "call-back." This is also the mechanism by which a part extends the set of event messages that it understands, which is in the Semantic Interface of the OpenDoc architecture. For each of the object specifiers supported by a part, along with object descripters, the part has registered a set of functions that support them (again, essentially call-backs). Complex object specifiers are decomposed in an outside-in or top-to-bottom fashion. At each step, a reference to the acquired data is passed (first the file is found, then the chapter is found in the file, then the paragraph is found in the chapter in the file, . . . ).

In FIG. 6, the event and object specifier are first encoded in step 104. The encoded script is then returned in step 106 to the sending application from where it is sent to the event manager in step 108. The event manager first routes the encoded script to the receiving application in step 110. The receiving application accepts the event and decodes the event, dispatching it to the appropriate function at step 112. The "Get" finction decodes the object specifier at step 114a and the appropriate application functions are called to resolve the object specifier at step 114b. The resolving activities occur at step 116 (from document to chapter to paragraph to word). Finally, the requested word is returned to the sending application in steps 118a, 118b and 118c.

This example: "get the fifth word of the second paragraph of the fourth chapter of the document called foo" may appear contrived, but consider that the sending application and the receiving application might be the same application and that the application has been factored into a UI component and a data engine component. Also consider that the example may be a word selected by a user and highlighted for placement on the clipboard, or perhaps as a hypertext reference. The event message can be captured and stored (along with others) for future use. Finally, such stored events can be fed to a scripted interface, generalized as necessary and turned into usable scripts.

The CHRON Class Type Invention

A new compound document part, herein denominated the CHRON part, allows the user working on a compound document to specify "script events" with which the operating system automatically executes designated scripts at predetermined times. FIG. 7 shows a compound document object 120 that includes two CHRON objects 122 and 124. Document 120 also by way of example is shown having an embedded text part 126, an embedded video part 128, a table part 130, and an image part 132. Each of the parts within document 120 may be opened by the user to view or edit its contents. The document-centric system automatically links each object to the part handler necessary for editing and/or viewing the content of the object. For instance, text object 126 can be opened by the user with a mouse click. The system then may respond to the mouse click by launching a part handler to display the text content of object 126 and/or launching a text editing application program to accept keyboard and mouse editing commands from the user. Both display and editing can be limited to a predefined window in the user display.

Viewing and editing of CHRON parts 122 and 124 is also accomplished by launching the part handlers needed to view and edit object content. In the case of CHRON object 122, the object content includes two schedule-time objects 134 and 136 together with a script object 138. Similarly, CHRON object 124 includes a schedule-time object 140 and a script object 142.

CHRON objects 122 and 124 are each separate instances of a CHRON class type based on the OpenDoc class type "Part" 36 (FIG. 1). The CHRON class type includes additional methods required to create persistent events that schedule script execution, which are described herein below in connection with FIG. 10. The CHRON class type also includes one or more script parts, exemplified by script part 138, each of which specify a script to be executed in a persistent event. A script to be executed, herein denominated a "script event," may involve any of the other objects within document 120, or some combination of such objects.

The CHRON class type also includes one or more scheduled-time parts (time/date), as exemplified by scheduled-time parts 134 and 136, each of which specifies when a script is to be executed. CHRON part 122 may also include a table part (not shown) that specifies the relationship between the two scheduled-time parts 134 and 136 and the single script part 138, for example. An instance of the CHRON class type may be inserted into any container part within a compound document, including the root document itself exemplified by document 120. Thus, although not shown, if script event 142 in CHRON part 124 causes the execution of a word search in the content model of text part 126, then CHRON part 124 could be embedded within text part 126 itself rather than in root document 120.

An important feature of the CHRON class type of this invention is the particular icon display presented to the user when the CHRON part is minimized. FIGS. 8A–8G provide several exemplary sketches of the CHRON icons of this invention. The critical function of the CHRON icon is to indicate visually the point in time at which the related script event is to execute. For instance, in FIG. 8A, icon 144a displays "Wednesday" to represent the embedded scheduled-time object in window 146a. Another window 148a displays a "ScriptEvent" identifier to advise the user of the script event that is to be executed every Wednesday. The icon display configuration in FIG. 8A is used for script events that repeatedly execute every week.

Similarly, in FIG. 8B, icon 144b includes a day and month indicator in window 146b and a ScriptEvent indicator in window 148b. Icon 144b alerts the user that ScriptEvent 148b is to run monthly on the 16th day. In FIG. 8C, icon 144c includes a time-of-day display in window 146c that informs the user to expect daily execution of the ScriptEvent named in window 148c at 1600 hours. In FIG. 8D, the weekday and time-of-day entries in window 146d of icon 144d inform the user that the ScriptEvent in window 148d is to be executed every Tuesday at 1600 hours. Icon 144d represents an alternative embodiment of icon 144a in FIG. 8A.

In FIG. 8E, icon 144e includes a table part identified in window 146e that specifies an irregular schedule for executing the ScriptEvent in window 148e. Conversely, FIG. 8F shows icon 144f with a single scheduled-time object displayed in window 146f, showing a time of day and day-of-week, and with multiple ScriptEvents identified in window 148f. Thus, icon 144f informs the user that several ScriptEvents are to be executed every Thursday at 2 PM, while icon 144e (FIG. 8E) informs the user that a single ScriptEvent is to be executed in accordance with a tabular schedule.

Finally, FIG. 8G shows CHRON icon 144g, which includes a specific hour, day, month, and year in window 146g to inform the user that the ScriptEvent in window 148g is to be executed only once at the specified date and hour.

Another important feature of the CHRON class type of this invention is its reusability. That is, each instance may be edited, removed and inserted as directed by the user. New instances may be spanned as necessary and edited by the user. FIGS. 9A–9D provide a rudimentary illustration of the user interface suitable for editing either of the several objects embedded in CHRON class type of this invention. For instance, in FIG. 9A, the user points to the scheduled-time window 150 and clicks the mouse to launch the scheduled-time object editor program (not shown). This editing program creates a user interface window, which is exemplified by window 152 in FIG. 9C. Window 152 includes the data field 154, the time field 156 and a register button 158. Clicking on either field 154 or 156 launches a field editor that accepts keyboard input in the usual manner. Clicking on register button 158 updates the persistent events stored by the system. This procedure is discussed below in connection with FIG. 10.

Figure 9A:
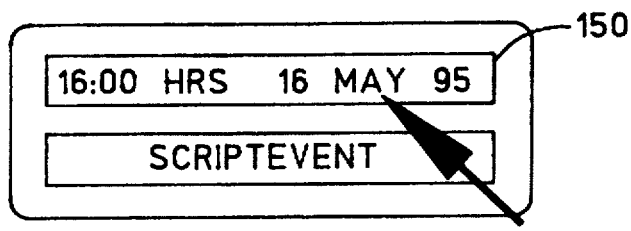
FIGS. 9A–9D are functional block diagrams illustrating the launching of part handlers for the CHRON Schedule-Time part and the CHRON ScriptEvent part of this invention.
Figure 9B:
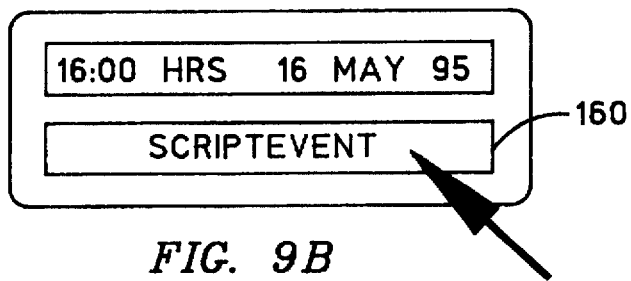
Figure 9C:
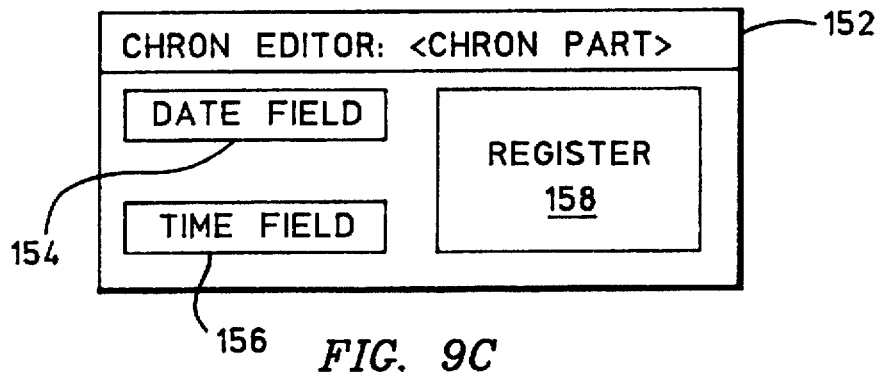
Figure 9D:
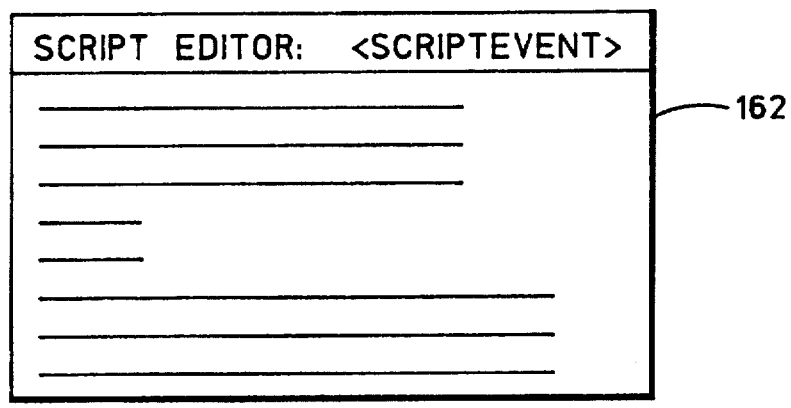

In FIG. 9B, the user points and clicks to the ScriptEvent field 160 to launch a script-editing program application, which creates a script editing window in the user display exemplified by script window 162 in FIG. 9D. Window 162 and the underlying application program allows the user to edit the script from the keyboard, for instance. Although not shown, a registration button similar to register button 158 in FIG. 9C may be included in window 162 to update the persistent event objects controlled by the edited CHRON part. Also, not shown, the two edit windows in FIGS. 9C–9D may be contained within a single edit "frame" launched responsive to either of FIGS. 9A–9B. Other useful variations in this GUI will occur to the skilled practitioner.

Figure 10:
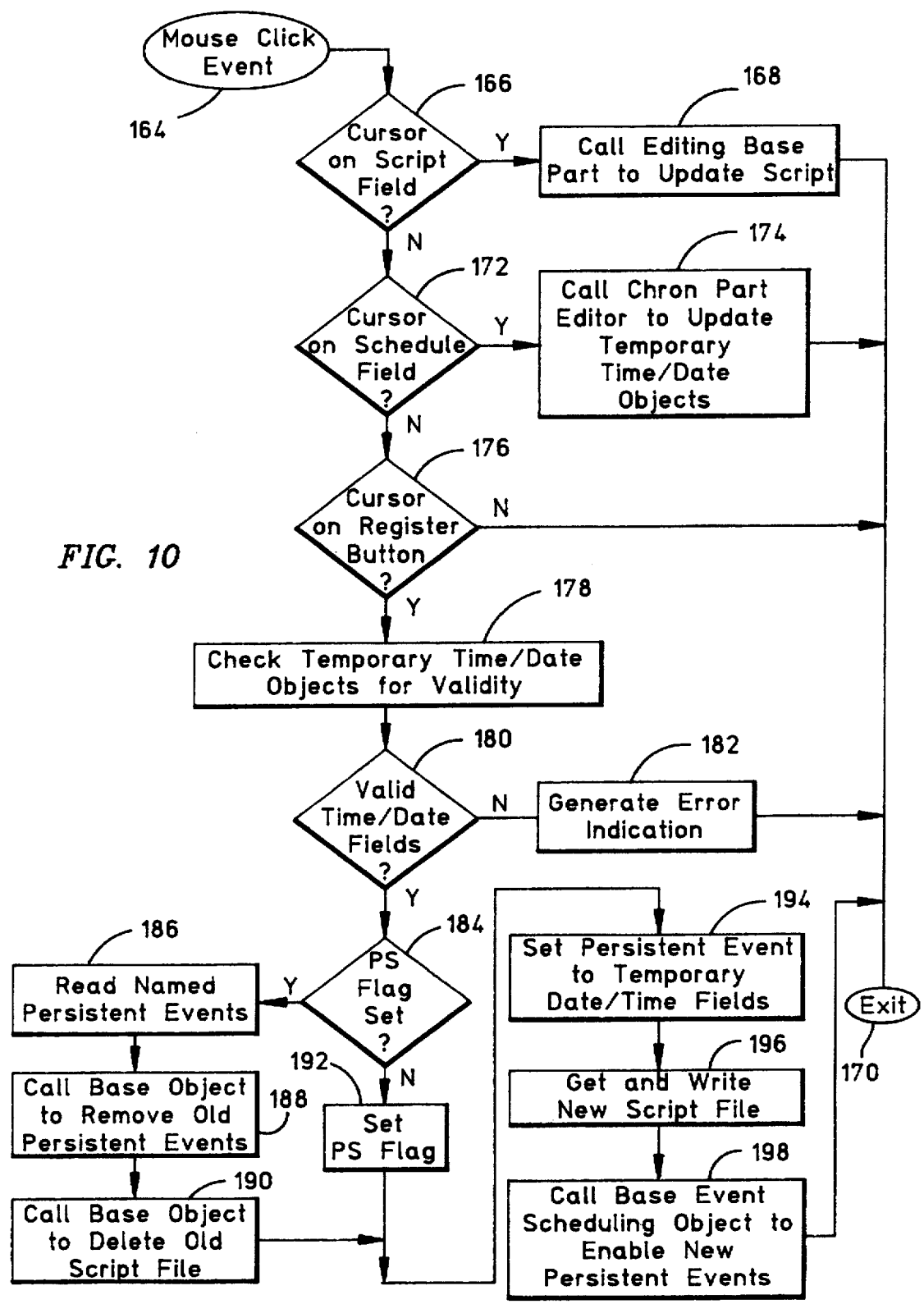
FIG. 10 is a functional block diagram of a flowchart illustrating the script execution scheduling method of this invention.

FIG. 10 provides a flowchart illustrating the operation of a scheduled-time object editor program in accordance with the method of this invention. The scheduled-time object editor first receives a mouse click event at step 164. This event is tested at step 166 and, if the cursor is pointing to the script field 160 (FIG. 9B), then step 168 launches the script-editing base part and opens window 162 (FIG. 9D), exiting at step 170. If step 166 fails, then step 172 tests the cursor for position with respect to schedule field 150 (FIG. 9A). If the user is pointing to the schedule field 150, then step 174 launches the scheduled-time object editor and opens window 152 (FIG. 9C), exiting at step 170.

If the cursor is neither on field 150 or field 160, then step 176 tests to see if the user is pointing to register field 158 (FIG. 9C), either within window 152 or elsewhere if possible. If so, then step 178 checks the temporary time/date objects created in step 174 to ensure their validity with respect to some syntax. Step 180 steers the process to step 182, generating an error indication and exiting at step 170 if the temporary time/date objects are not valid. If valid, then step 184 tests a "persistent state" (PS) flag, which is set only when the CHRON object being edited is linked to existing persistent events in system storage. The PS flag is a feature that permits each CHRON part to be reused repeatedly.

If PS flag is set, then step 186 examines the existing persistent events, step 188 calls the event scheduling subsystem within the base operating system to remove the old persistent events and step 190 calls the base operating system to delete the file containing the old script. If step 184 finds that the PS flag is not set, then step 192 immediately sets the PS flag. After either setting the PS flag or removing old persistent events and script files, step 194 creates new persistent events according to the temporary date/time fields validated in step 180. Step 196 then gets and writes the new script file, which may be the same as the old script file or some other file edited by the user in the manner discussed above in connection with FIGS. 9B and 9D. Finally, step 198 calls the event scheduling subsystem within the base operating system to create and store new persistent events. As used herein, a persistent event represents an operating system object that automatically executes a named script at a predetermined date and time under operating system control.

Figure 11:
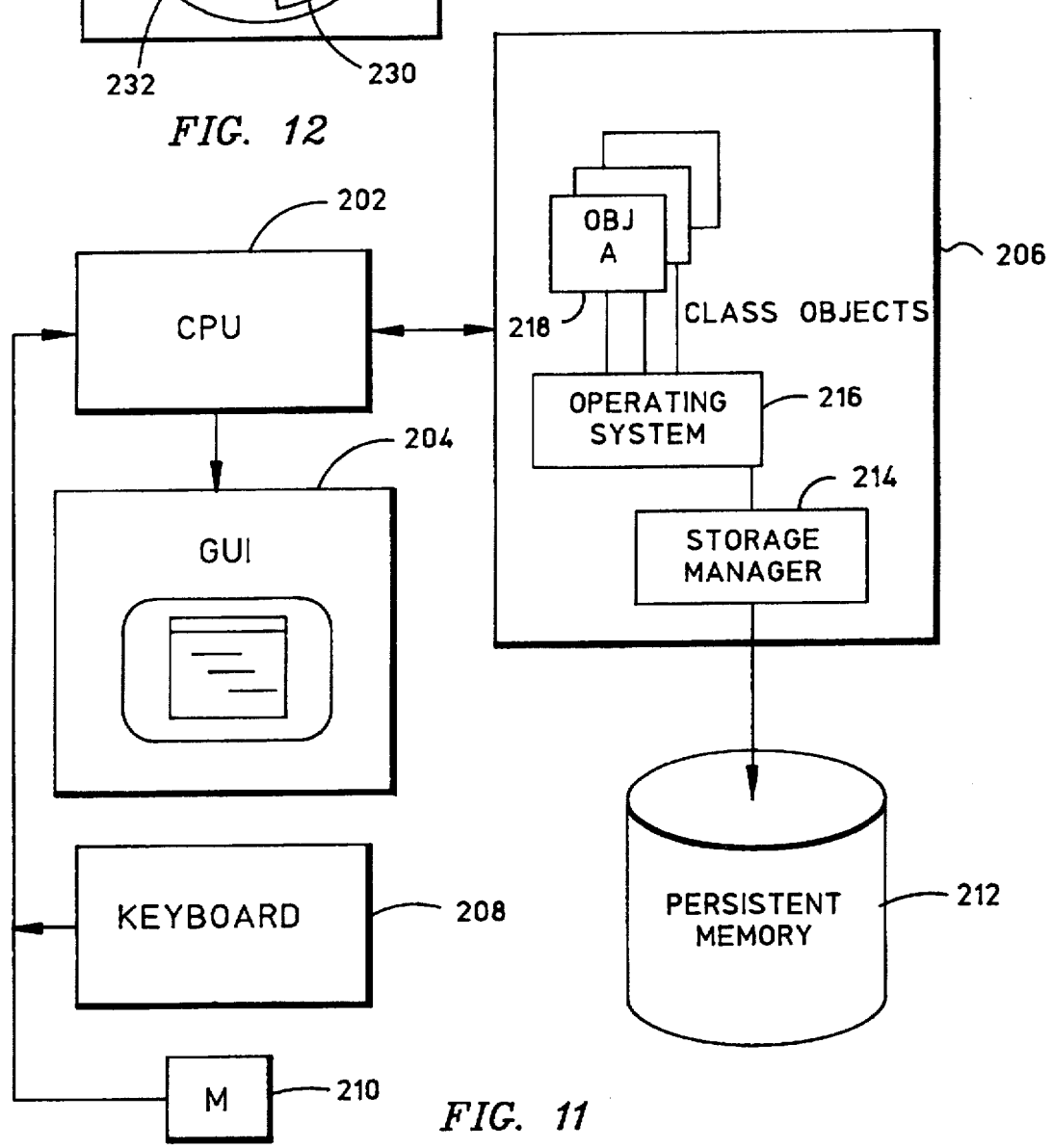
FIG. 11 is a functional block diagram of an illustrative embodiment of a document-centric processing system in accordance with this invention.

While the invention discussed above is primarily disclosed as a process, practitioners of ordinary skill in the art can appreciate that an apparatus or system, such as the system illustrated in FIG. 11, can be programmed or otherwise designed to facilitate the practice of the process of this invention. For instance, system 200 in FIG. 11 may include a central processing Unit (CPU) 202 linked to a graphical user interface (GUI) display 204 and a memory system 206. The system user may view and edit compound documents from a keyboard 208 and a mouse 210 in combination with GUI display 204. Memory 206 may be linked to a persistent data storage subsystem 212 in the usual manner. In a compound document system, memory 206 may include numerous program objects, exemplified by a storage manager program object 214 for controlling data transfers between memory 206 and persistent memory 212, an operating system object 216 for controlling all system activities, and a plurality of class type instances, otherwise herein denominated "objects," exemplified by object 218. By way of example, object 218 may represent a compound document including an instance of the CHRON class type of this invention. It can be understood and appreciated that a computer system exemplified by system 200 in FIG. 11 also falls within the spirit and scope of this invention.

Figure 12:
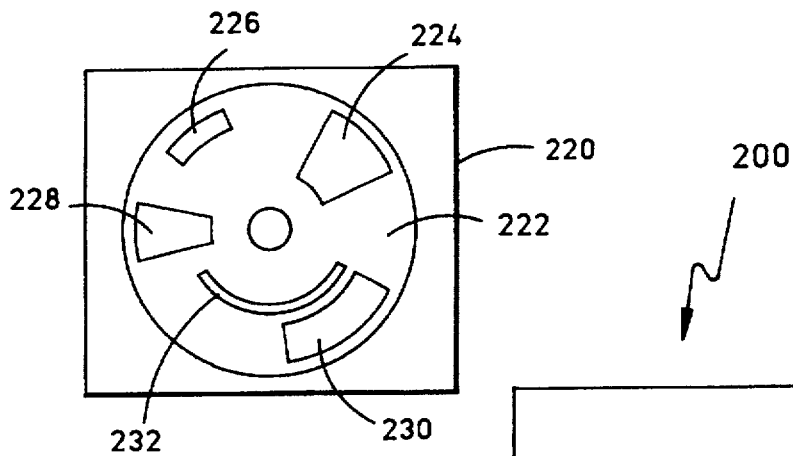
FIG. 12 is a schematic diagram of an exemplary computer program product configured in accordance with this invention.

It can also be understood and appreciated by any practitioner of ordinary skill in the art that an article of manufacture, such as the pre-recorded floppy disk 220 in FIG. 12, also falls within the spirit and scope of this invention when it includes means recorded thereon for directing a computer system such as system 200 of FIG. 11 to facilitate the practice of this invention. For instance, computer program product 220 includes a recording medium 222 on which is recorded program objects 224, 226, 228, 230 and 232, each for directing a computer processing system to facilitate the practice of some portion of the method of this invention. Even where no single program object 224-232 includes the complete method of this invention, objects 224-232 together may comprise all program means necessary for directing a computer processing system to facilitate the practice of the method of this invention. It can be readily understood and appreciated that computer program products such as computer program product 220 in FIG. 12 also fall within the spirit and scope of this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. In a machine-implemented document-centric application processing system including a data processor coupled to a user display, to means for accepting user requests and to memory means including persistent storage means for storing an object-oriented operating system and a class library of objects including a plurality of data objects and a plurality of program objects, said memory means including a script-editing program object, a schedule-time object editor, an icon-display program object, an event-scheduling system and a plurality of parts and part editors, a machine-executed method for scheduling script execution in a compound document object, said method comprising the steps of:

(a) spawning in said memory means an instance of a reusable CHRON object including at least one script object and at least one schedule-time object, said instance being contained in said compound document object;

(b) creating for display on said user display a CHRON icon having at least one schedule field for displaying at least part of said at least one schedule-time object;

(c) responsive to a user request to revise said at least one schedule-time object, performing the steps of
 (c.1) spawning in said memory means an instance of said schedule-time object editor and
 (c.2) updating a temporary schedule-time object in said memory means according to at least one corresponding said user request;

(d) comparing said temporary schedule-time object to a valid schedule-time object format rule;

(e) returning an error condition to said user display if said temporary schedule-time object form is invalid; otherwise (f) sending a message to said event-scheduling system requesting the creation of a persistent event object for executing said at least one script object according to the schedule specified by said temporary schedule-time object.

2. The method of claim 1 wherein each said CHRON icon schedule field comprises:

a time-of-day display when said schedule-time object schedules the daily execution of the corresponding said script object at said time-of-day;

a time-date-year display when said schedule-time object schedules a single execution of the corresponding said script object at said time-date-year;

a date display when said schedule-time object schedules the annual execution of the corresponding said script object at said date;

a weekday display when said schedule-time object schedules the weekly execution of the corresponding said script object; and no time display when said schedule-time object schedules execution of the corresponding said script object according to an internal tabular specification.

3. The method of claim 2 further comprising the step of:

(g) responsive to a user request to edit said at least one script object, performing the steps of
 (g.1) spawning in said memory means an instance of said script object editor and
 (g.2) updating a persistent script object in said memory means according to at least one corresponding said user request.

4. The method of claim 1 further comprising the step of:

(g) responsive to a user request to edit said at least one script object, performing the steps of
 (g.1) spawning in said memory means an instance of said script object editor and
 (g.2) updating a persistent script object in said memory means according to at least one corresponding said user request.

5. A reusable compound document script scheduling object for scheduling script execution in a compound document object in a machine-implemented document-centric application processing system including a data processor coupled to a user display, to means for accepting user requests and to memory means including persistent storage means for storing an object-oriented operating system and a class library of objects including a plurality of data objects and a plurality of program objects, said memory means including a script-editing program object, a schedule-time object editor, an icon-display program object, an event-scheduling system and a plurality of parts and part editors, said reusable script scheduling object comprising:

at least one script object having information for specifying a script to be executed at a predetermined time;

at least one schedule-time object having information for specifying at least one predetermined time at which the associated said script object is scheduled for execution;

object container means stored in said memory means for containing said at least one script object and said at least one schedule-time object and for linking the components of said reusable script scheduling object with other said parts contained in said compound document; and registration means coupled to said event-scheduling system for creating a persistent event object in said persistent storage means for executing said script at said predetermined time.

6. The reusable script scheduling object of claim 5 further comprising:

icon display means for creating for display on said user display a CHRON icon having at least one schedule field for displaying at least part of said at least one schedule-time object; and GUI linkage means coupled to said schedule-time object for launching said schedule-time object editor for editing said schedule-time object responsive to a user request.

7. The reusable script scheduling object of claim 6 wherein each said CHRON icon schedule field comprises:

a time-of-day display when said schedule-time object schedules the daily execution of the corresponding said script object at said time-of-day;

a time-date-year display when said schedule-time object schedules a single execution of the corresponding said script object at said time-date-year;

a date display when said schedule-time object schedules the annual execution of the corresponding said script object at said date;

a weekday display when said schedule-time object schedules the weekly execution of the corresponding said script object; and no time display when said schedule-time object schedules execution of the corresponding said script object according to an internal tabular specification.

8. The reusable script scheduling object of claim 7 wherein said GUI linkage means includes means for launching said script-editing program object to edit said script object responsive to a user request.

9. The reusable script scheduling object of claim 6 wherein said GUI linkage means includes means for launching said script-editing program object to edit said script object responsive to a user request.

10. An object-oriented compound document processing system comprising:

a data processor;

a user display coupled to said data processor;

means for accepting user requests coupled to said data processor;

memory means including persistent storage means coupled to said data processor for storing an object-oriented operating system and a class library of objects including a plurality of data objects and a plurality of program objects;

an event-scheduling system coupled to said object oriented operating system in said memory means for creating persistent event objects in said persistent storage means;

a plurality of compound documents each containing one or more parts in said memory means;

a plurality of part editors each for editing a particular part type in said memory means;

one or more reusable script-scheduling objects each for scheduling script execution in a compound document;

at least one script object in each said reusable script-scheduling object for specifying a script to be executed at a predetermined time;

at least one script-editing program object in said memory means for editing said script objects in said memory means;

at least one schedule-time object in each said reusable script scheduling-object for specifying at least one predetermined time at which an associated said script object is scheduled for execution;

at least one schedule-time object editor in said memory means for editing said schedule-time objects; and registration means in each said reusable script scheduling object coupled to said event-scheduling system for creating a persistent event object in said persistent storage means for executing said script at said predetermined time.

11. The object-oriented compound document processing system of claim 10 further comprising:

icon display means for creating for display on said user display a CHRON icon having at least one schedule field for displaying at least part of said at least one schedule-time object;

GUI linkage means coupled to said schedule-time object for launching said schedule-time object editor for editing said schedule-time object responsive to a user request.

12. The object-oriented compound document processing system of claim 11 wherein each said CHRON icon schedule field comprises:

a time-of-day display when said schedule-time object schedules the daily execution of the corresponding said script object at said time-of-day;

a time-date-year display when said schedule-time object schedules a single execution of the corresponding said script object at said time-date-year;

a date display when said schedule-time object schedules the annual execution of the corresponding said script object at said date;

a weekday display when said schedule-time object schedules the weekly execution of the corresponding said script object; and no time display when said schedule-time object schedules execution of the corresponding said script object according to an internal tabular specification.

13. The object-oriented compound document processing system of claim 12 wherein said GUJI linkage means includes means for launching said script-editing program object to edit said script object responsive to a user request.

14. The object-oriented compound document processing system of claim 11 wherein said GUI linkage means includes means for launching said script-editing program object to edit said script object responsive to a user request.

15. A computer program product for use in scheduling script execution in compound document objects in a machine-implemented document-centric application processing system including a data processor coupled to a user display, to means for accepting user requests and to memory means including persistent storage means for storing an object-oriented operating system and a class library of objects including a plurality of data objects and a plurality of program objects, said memory means including a script-editing program object, a schedule-time object editor, an icon-display program object, an event-scheduling system and a plurality of parts and part editors, said computer program product comprising:

a recording medium;

means recorded on said recording medium for directing said document-centric application processing system to spawn in said memory means an instance of a reusable CHRON object including at least one script object and at least one schedule-time object, said instance being contained in said compound document object;

means recorded on said recording medium for directing said document-centric application processing system to create for display on said user display a CHRON icon having at least one schedule field for displaying at least part of said at least one schedule-time object;

means recorded on said recording medium for directing said document-centric application processing system to perform the steps of, responsive to a user request to revise said at least one schedule-time object, spawning in said memory means an instance of said schedule-time object editor and updating a temporary schedule-time object in said memory means according to at least one corresponding said user request;

means recorded on said recording medium for directing said document-centric application processing system to compare said temporary schedule-time object to a valid schedule-time object format rule in said memory means;

means recorded on said recording medium for directing said document-centric application processing system to perform the steps of returning an error condition to said user display if said temporary schedule-time object form is invalid, otherwise sending a message to said event-scheduling system requesting the creation of a persistent event object for executing said at least one script object according to the schedule specified by said temporary schedule-time object.

16. The computer program product of claim 15 wherein each said CHRON icon schedule field comprises:

a time-of-day display when said schedule-time object schedules the daily execution of the corresponding said script object at said time-of-day;

a time-date-year display when said schedule-time object schedules a single execution of the corresponding said script object at said time-date-year;

a date display when said schedule-time object schedules the annual execution of the corresponding said script object at said date;

a weekday display when said schedule-time object schedules the weekly execution of the corresponding said script object; and no time display when said schedule-time object schedules execution of the corresponding said script object according to an internal tabular specification.

17. The computer program product of claim 16 further comprising:

means recorded on said recording medium for directing said document-centric application processing system to perform the steps of, responsive to a user request to edit said at least one script object, spawning in said memory means an instance of said script object editor and updating a persistent script object in said memory means according to at least one corresponding said user request.

18. The computer program product of claim 15 further comprising:

means recorded on said recording medium for directing said document-centric application processing system to perform the steps of, responsive to a user request to edit said at least one script object, spawning in said memory means an instance of said script object editor and updating a persistent script object in said memory means according to at least one corresponding said user request.

* * * * *